US012570215B2

(12) United States Patent
Zhang et al.

(10) Patent No.: US 12,570,215 B2
(45) Date of Patent: Mar. 10, 2026

(54) MOVABLE PEDAL, ELECTRIC PEDAL APPARATUS AND PEDAL SYSTEM

(71) Applicant: Zhongshan AOD Electronics Technology Co., Ltd., Zhongshan (CN)

(72) Inventors: Jingyu Zhang, Zhongshan (CN);
Xiangliang Meng, Zhongshan (CN);
Xuanmo Guo, Zhongshan (CN)

(73) Assignee: Zhongshan AOD Electronics Technology Co., Ltd., Zhongshan (CN)

( * ) Notice: Subject to any disclaimer, the term of this patent is extended or adjusted under 35 U.S.C. 154(b) by 0 days.

(21) Appl. No.: 19/086,062

(22) Filed: Mar. 20, 2025

(65) Prior Publication Data

US 2025/0368137 A1    Dec. 4, 2025

(30) Foreign Application Priority Data

| May 31, 2024 | (CN) | 202410703547.1 |
| Jul. 20, 2024 | (CN) | 202421723421.2 |
| Jul. 20, 2024 | (CN) | 202421723422.7 |
| Oct. 12, 2024 | (CN) | 202411423351.3 |
| Jan. 23, 2025 | (CN) | 202510113131.9 |

(51) Int. Cl.
B60R 3/02          (2006.01)

(52) U.S. Cl.
CPC ..................................... B60R 3/02 (2013.01)

(58) Field of Classification Search
CPC ..................................................... B60R 3/02
See application file for complete search history.

(56) References Cited

U.S. PATENT DOCUMENTS

| 7,976,042 B2 * | 7/2011 | Watson | B60R 3/02 |
| | | | 280/166 |
| 8,136,826 B2 * | 3/2012 | Watson | B60R 3/02 |
| | | | 280/166 |
| 10,077,016 B2 * | 9/2018 | Smith | B60R 19/48 |
| 2018/0001825 A1 | 1/2018 | Long et al. | |
| 2022/0306004 A1 * | 9/2022 | Johnson | B60R 3/02 |
| 2023/0021767 A1 * | 1/2023 | Watson | B60R 3/02 |

FOREIGN PATENT DOCUMENTS

| CN | 108068703 A | 5/2018 |
| CN | 109383392 A | 2/2019 |
| CN | 110843680 A | 2/2020 |
| CN | 211918528 U | 11/2020 |
| CN | 216761625 U | 6/2022 |
| CN | 116279141 A | 6/2023 |
| CN | 220163763 U | 12/2023 |
| KR | 20230149038 A | 10/2023 |

* cited by examiner

*Primary Examiner* — Bryan A Evans

(57) ABSTRACT

A movable pedal, an electric pedal apparatus and a pedal system are disclosed. The movable pedal is applied to a vehicle, and includes a pedal body. A first surface is provided on an upper side of the pedal body, and the first surface is configured for being trampled by drivers and passengers. A mounting slot is formed in an approaching side of the pedal body, and a notch of the mounting slot faces the vehicle. A drive device can be connected to the pedal body through the mounting slot in a blind assembly, and the drive device can drive the pedal body to switch between an unfolded state and a retracted state.

19 Claims, 9 Drawing Sheets

1000

240 [241 / 242]    241    Q8    242    2421
210    Q6    200    221    220    2411    241    2421
Q7    231
230    300
130 [131 / 132 / 133 / 134]    400    132    133    134    110    131    1211    121
100 [110 / 120 / 130]    125    123    1231    132    127    123 / 125 / 127] 120

MOVABLE PEDAL, ELECTRIC PEDAL APPARATUS AND PEDAL SYSTEM

CROSS-REFERENCE TO RELATED APPLICATION

This application is based on and claims the benefits of priorities from Chinese Patent Application No. 2024107035471, filed on May 31, 2024, Chinese Patent Application No. 2024217234212, filed on Jul. 20, 2024, Chinese Patent Application No. 2024217234227, filed on Jul. 20, 2024, Chinese Patent Application No. 2024114233513, filed on Oct. 12, 2024, and Chinese Patent Application No. 2025101131319, filed on Jan. 23, 2025, the entirety of which are incorporated by reference herein.

TECHNICAL FIELD

The present disclosure relates to the field of automobile accessories, and in particular, to a movable pedal, an electric pedal apparatus and a pedal system.

BACKGROUND

In high-chassis models, pedals are usually mounted on side skirts to facilitate entry and exit for drivers and passengers. These pedals are available in both stationary and electric types. The electric pedal is popular among users because it can automatically unfold when the door is opened to assist passengers in getting on and off, and automatically retract when the door is closed, which not only ensures the vehicle's passability, but also maintains a neat appearance and reduces the automobile's wind resistance.

SUMMARY

According to a technical scheme adopted in the present disclosure, a movable pedal is provided, which is applied to a vehicle. The movable pedal includes a pedal body; a first surface is provided on an upper side of the pedal body, and the first surface being used for being trampled by drivers and passengers; and a mounting slot being formed in an approaching side of the pedal body, a notch of the mounting slot facing the carrier, and a drive device being able to be connected to the pedal body through the mounting slot in a blind assembly, where the drive device can drive the pedal body to switch between an unfolded state and a retracted state.

According to another technical scheme adopted in the present disclosure, an electric pedal apparatus is to provided, including a drive device and a movable pedal, where the drive device is in drive connection with the movable pedal, and the movable pedal is the movable pedal described above.

According to yet another technical scheme adopted in the present disclosure, a pedal system is provided, including an electric pedal apparatus and a side skirt, the side skirt being able to be fixed to a vehicle and provided with a receiving cavity, the electric pedal apparatus including a mounting seat and a movable pedal capable of being unfolded or retracted relative to the mounting seat, the mounting seat being arranged in the receiving cavity, where when the movable pedal is in a retracted state, at least a part of the structure of the movable pedal is allowed to be received in the receiving cavity, and the electric pedal apparatus is the electric pedal apparatus described above.

In the technical scheme of the present disclosure, since the position at which the drive device is connected to the pedal body is arranged in the mounting slot, the pedal surface area of the pedal body is fully utilized; and furthermore, due to the blind connection of the drive device and the pedal body, the pedal body can remain neat and aesthetic when in the unfolded state. In this way, the pedal surface area of the movable pedal is highly utilized and the movable pedal can remain neat and aesthetic when in the unfolded state.

BRIEF DESCRIPTION OF DRAWINGS

In order to more clearly illustrate the technical schemes in the embodiments of the present disclosure, the accompanying drawings required for use in the description of the embodiments will be briefly introduced below. Obviously, the accompanying drawings described below are only some embodiments of the present disclosure. Those of ordinary skill in the art can also obtain other drawings according to these accompanying drawings without contributing creative work.

Figure 1:
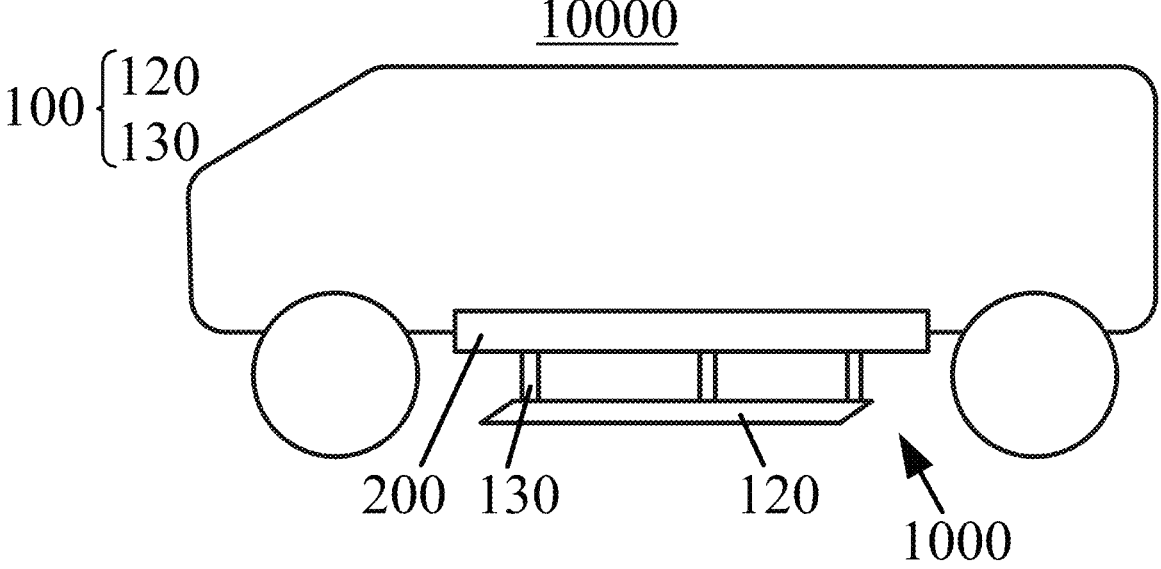
FIG. 1 is a schematic structural diagram of a vehicle provided in some embodiments of the present disclosure.

Description of reference numerals: vehicle 10000, pedal system 1000, electric pedal apparatus 100, mounting seat 110, limiting structure 111, movable pedal 120, first panel 121, first surface 1211, second pedal 122, second surface 1221, third panel 123, third surface 1231, mounting slot 124, hinge hole 1241, first end cover 125, second end cover 126, pedal body 127, drive device 130, drive arm 131, support arm 132, electric motor 133, link assembly 134, first link 1341, second link 1342, cushion pad 140, side skirt 200, receiving cavity 210, fourth panel 220, fourth surface 221, fifth panel 230, fifth surface 231, sixth panel 240, first sub-panel 241, sixth surface 2411, second sub-panel 242, seventh surface 2421, first sheet metal assembly 300, second sheet metal assembly 400, first axis L1, second axis L2, third axis L3, fourth axis L4, fifth axis L5, central axis L6, first hinge point D1, second hinge point D2, central point O, first included angle Q1, second included angle Q2, third included angle Q3, fourth included angle Q4, fifth included angle Q5, sixth included angle Q6, seventh included angle Q7, eighth included angle Q8.

DETAILED DESCRIPTION

The technical scheme in the embodiments of the present disclosure will be clearly and completely described below in combination with the accompanying drawings in the embodiments of the present disclosure. It is understood that the specific embodiments described herein are merely used to explain the present disclosure, instead of limiting the present disclosure. In addition, it also needs to note that, for easy description, some structures rather than all structures related to the present disclosure are only illustrated in the drawings. Based on the embodiments of the present disclosure, all the other embodiments obtained by those of ordinary skill in the art on the premise of not contributing creative effort should belong to the protection scope of the present disclosure.

The terms such as "first", "second", "third", and so on in the present disclosure are merely used for description, instead of being understood as indicating or implying relative importance or impliedly indicating the quantity of the indicated technical features. Thus, the features defined with terms such as "first", "second", "third", and so on may expressly or impliedly one or more features. In the description of the present disclosure, "a plurality of" means at least two, such as two or three, unless specific limitation otherwise. All directional indications (such as: upper, lower, left, right, front, rear, etc.) in the embodiments of the present disclosure are merely used to explain the relative position relation, movement and the like of various components under a certain special posture (as shown in the drawings); and if the special posture is changed, the directional indications will change accordingly. In addition, terms "include", "have", and any modification thereof are intended to cover non-exclusive inclusion. For example, processes, methods, systems, products, or devices that contain a series of steps or units are not defined in those steps or units that are listed, but optionally further include steps or units that are not listed or, optionally further include other steps or units inherent to these processes, methods, products, or devices.

"Embodiment" mentioned herein means that the specific characteristics, structures, or features described in combination with the embodiments may be included in at least one embodiment of the present disclosure. This phrase occurred in various positions of the specification does not necessarily refer to the same embodiment, and is also not the independent or alternative embodiment mutually exclusive with other embodiments. Those skilled in the art explicitly and implicitly understood that the embodiments described herein may be combined with other embodiments.

Figure 2:
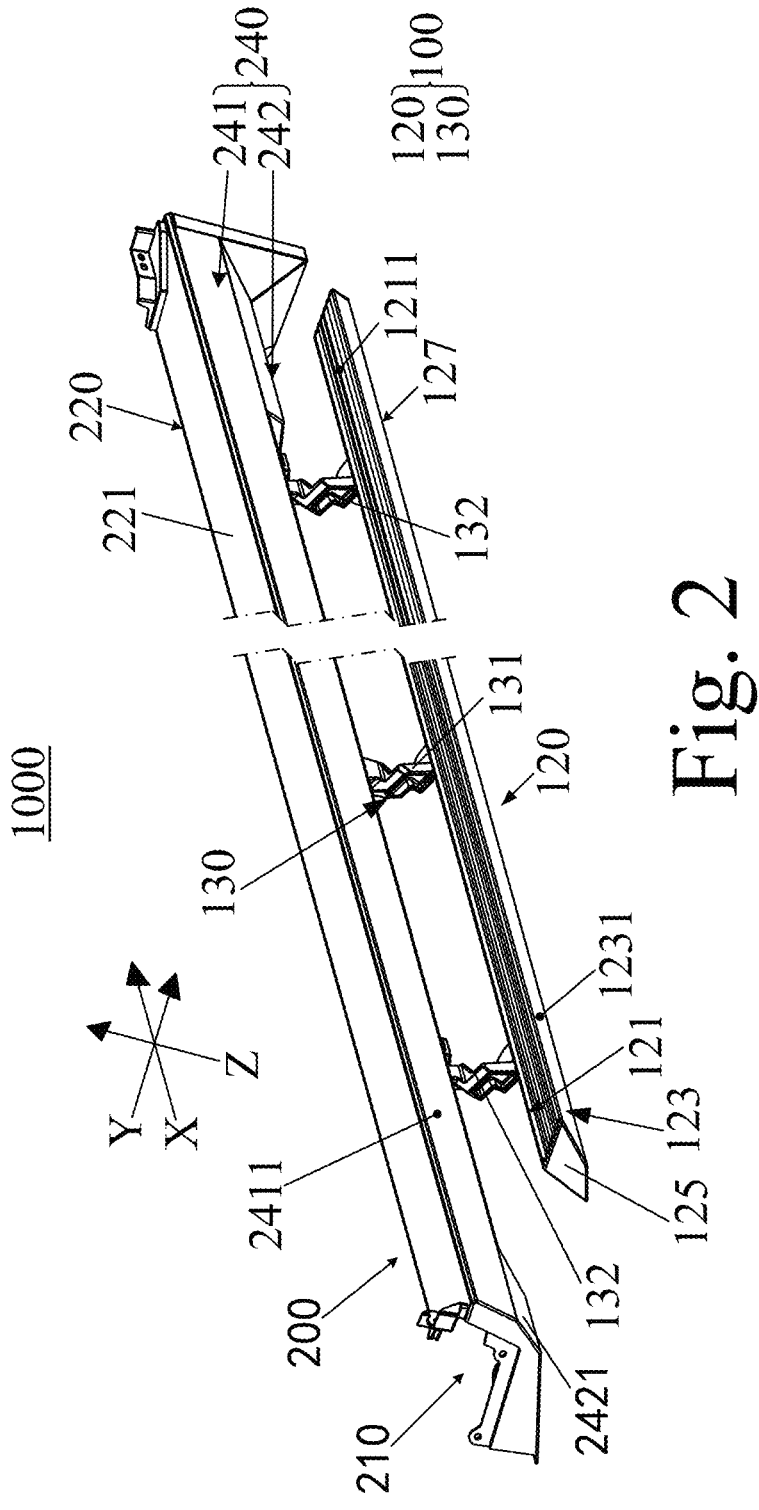
FIG. 2 is a schematic structural diagram of a pedal system when a movable pedal is in an unfolded state, provided by some embodiments of the present disclosure.

In the present disclosure, "upper side" refers to the side away from the ground when the pedal system is mounted on a vehicle, referring to a positive direction of the Z axis in FIG. 2; "lower side" refers to the side facing the ground when the pedal system is mounted on the vehicle, referring to a negative direction of the Z axis in FIG. 2; "approaching side" refers to the side facing the vehicle when the pedal system is mounted on the vehicle, referring to a negative direction of the Y axis in FIG. 2; and "far side" refers to the side away from the vehicle when the pedal system is mounted on the vehicle, referring to a positive direction of the Y axis in FIG. 2.

The movable pedal provided by the present disclosure is applied to the vehicle. The movable pedal includes a pedal body. A first surface is provided on an upper side of the pedal body, and the first surface is configured for being trampled by drivers and passengers. A mounting slot is formed in an approaching side of the pedal body, and a notch of the mounting slot faces the vehicle. A drive device is able to be connected to the pedal body in a hidden manner through the mounting slot. The drive device can drive the pedal body to switch between an unfolded state and a retracted state. In the technical scheme of the present disclosure, since the position at which the drive device is connected to the pedal body is arranged in the mounting slot, the pedal surface area of the pedal body is fully utilized; and furthermore, due to the hidden-type connection of the drive device and the pedal body, the pedal body can remain neat and aesthetic when in the unfolded state. In this way, the pedal surface area of the movable pedal is highly utilized and the movable pedal can remain neat and beautiful when in the unfolded state.

FIG. 1 is a schematic structural diagram of a vehicle provided in some embodiments of the present disclosure. The vehicle 10000 can include, but is not limited to, a pedal system 1000. The pedal system 1000 is configured to assist drivers and passengers in getting in and out of the vehicle 10000 conveniently, so as to improve the intelligence and comfort of the vehicle 10000. The pedal system 1000 can include, but is not limited to, an electric pedal apparatus 100 and a side skirt 200. When the electric pedal apparatus 100 is in the unfolded state, the movable pedal 120 in the electric pedal apparatus 100 and the side skirt 200 form a step structure, so that the drivers and passengers can conveniently get in and out of the vehicle 10000 through this step structure. When the electric pedal apparatus 100 is in the retracted state, the drive device 130 in the electric pedal apparatus 100 can be received in the space formed by the side skirt 200 and the movable pedal 120, so that the drive device 130 can be fully protected when the vehicle 10000 is driving in harsh working conditions. In this embodiment, the vehicle 10000 is a car, and specifically may be a pickup truck, a sport utility vehicle (SUV), an off-road vehicle, etc.

Figure 3:
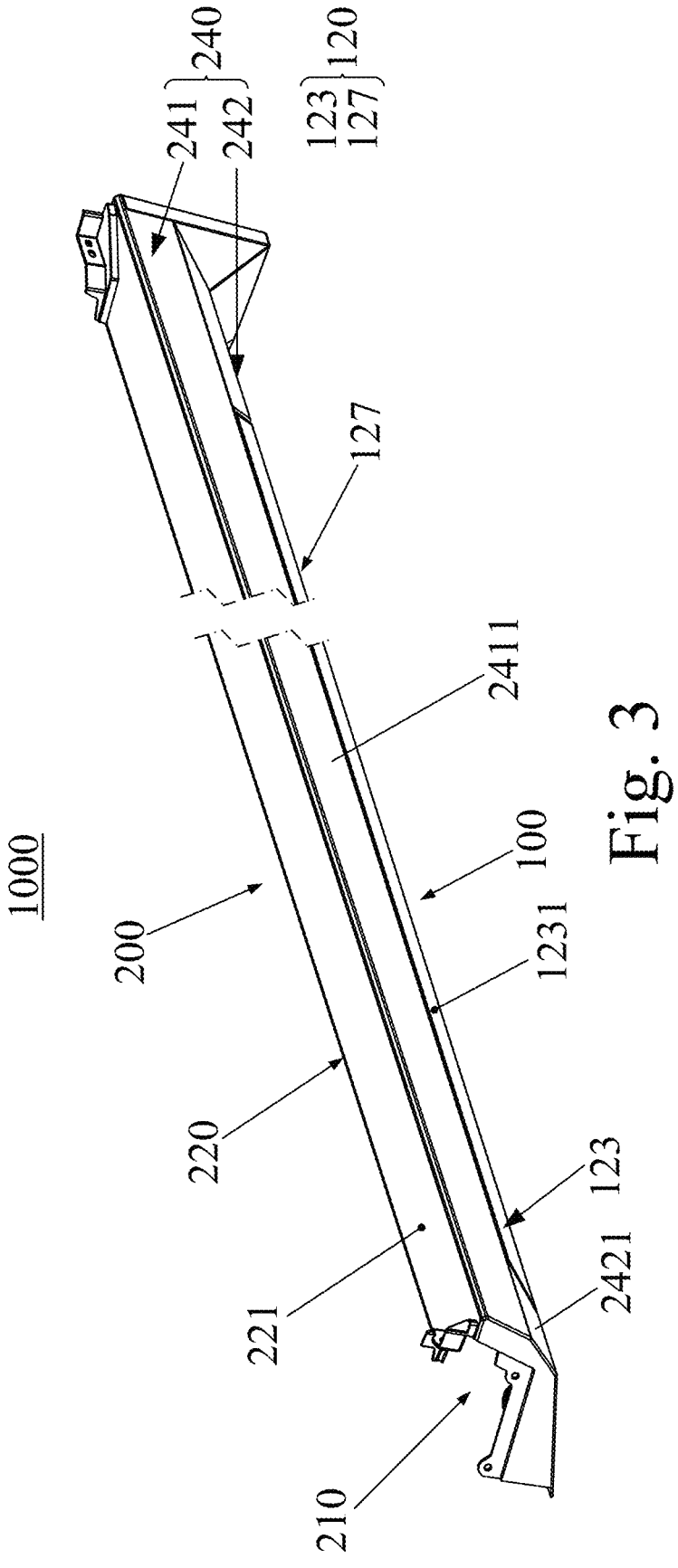
FIG. 3 is a schematic structural diagram of a pedal system when a movable pedal is in a retracted state, provided by some embodiments of the present disclosure.
Figure 4:
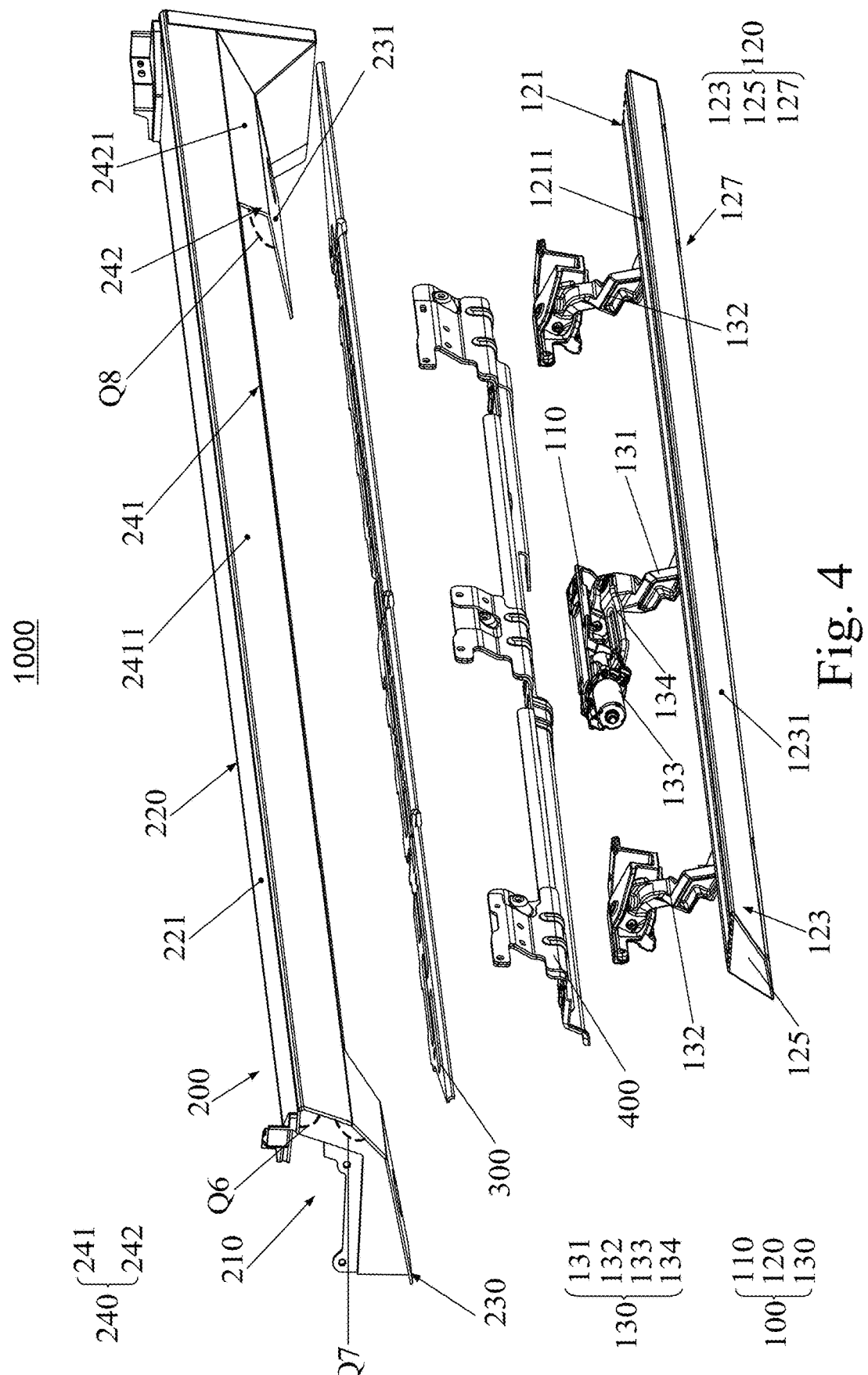
FIG. 4 is an exploded view of a pedal system provided by some embodiments of the present disclosure.

Please refer to FIGS. 1-4 in combination. FIG. 2 is a schematic structural diagram of a pedal system when a movable pedal is in an unfolded state, provided by some embodiments of the present disclosure; FIG. 3 is a schematic structural diagram of a pedal system when a movable pedal is in a retracted state, provided by some embodiments of the present disclosure; and FIG. 4 is an exploded view of a pedal system provided by some embodiments of the present disclosure. The pedal system 1000 provided in the present disclosure can include, but is not limited to, an electric pedal apparatus 100 and a side skirt 200. The side skirt 200 can be fixed to the vehicle 10000. The side skirt 200 defines a receiving cavity 210. The electric pedal apparatus 100 may include, but is not limited to, a mounting seat 110 and a movable pedal 120. The mounting seat 110 is disposed in the receiving cavity 210. The movable pedal 120 is expandable or retractable relative to the mounting seat 110. When the movable pedal 120 is in the unfolded state, the movable pedal 120 and the side skirt 200 form a step structure, to assist drivers and passenger in getting in and out of the cabin conveniently. When the movable pedal 120 is in the retracted state, at least a part of the structure of the movable pedal 120 can be received in the receiving cavity 210, and the drive device 130 is received in the space formed by the side skirt 200 and the movable pedal 120, to obtain protection.

In an embodiment, the pedal system 1000 further includes a first sheet metal assembly 300 and a second sheet metal assembly 400. The mounting seat 110 is fixed to the side skirt 200 through the first sheet metal assembly 300, so that the electric pedal apparatus 100 and the side skirt 200 are combined to form the pedal system 1000. The mounting seat 110 is fixed to the vehicle 10000 through the second sheet metal assembly 400, so that the fixation of the electric pedal apparatus 100 to the vehicle 10000 and the fixation of the side skirt 200 to the vehicle 10000 can be coordinated with each other. In this way, the pedal system 1000 can be securely connected to the vehicle 10000.

In an embodiment, a fourth panel 220 is provided on the upper side of the side skirt 200. The fourth panel 220 is provided with a fourth surface 221. The fourth surface 221 is parallel to the first surface 1211 of the movable pedal 120. A fifth panel 230 is provided on the lower side of the side skirt 200. The fifth panel 230 is provided with a fifth surface 231. The fifth surface 231 is parallel to the fourth surface 221. A sixth panel 240 is provided on the far side of the side skirt 200. The sixth panel 240 is connected between the fourth panel 220 and the fifth panel 230. The sixth panel 240 includes a first sub-panel 241 and a second sub-panel 242 that are connected to each other. The first sub-panel 241 is provided with a sixth surface 2411. The sixth surface 2411 intersects the fourth surface 221 at a sixth included angle Q6, where the sixth included angle Q6 is greater than 45° and less than 90°, and can be specifically 46°, 48°, 50°, 52°, 55°, 58°, 60°, 62°, 65°, 68°, 70°, 72°, 75°, 78°, 80°, 83° and 88°, etc. In this embodiment, the sixth included angle Q6 is 77°. The second sub-panel 242 is provided with a seventh surface 2421. The seventh surface 2421 intersects the sixth surface 2411 at a seventh included angle Q7, where the seventh included angle Q7 is greater than 130° and less than 160°, and can be specifically 132°, 135°, 138°, 140°, 142°, 145°, 148°, 150°, 152°, 155° and 158°, etc. In this embodiment, the seventh included angle Q7 is 154.45°. The seventh surface 2421 intersects the fifth surface 231 at an eighth included angle Q8, where the eighth included angle Q8 is greater than 130° and less than 160°, and can be specifically 132°, 135°, 138°, 140°, 142°, 145°, 148°, 150°, 152°, 155° and 158°, etc. In this embodiment, the eighth included angle Q8 is 145.33°.

In an embodiment, when the movable pedal 120 is in the retracted state, the third panel 123 of the movable pedal 120 is flush with the second sub-panel 242 of the side skirt 200. The second panel 122 of the movable pedal 120 is flush with the fifth panel 230 of the side skirt 200, so as to improve the overall aesthetics of the pedal system 1000 and reduce the wind resistance when the vehicle 10000 is driving.

In an embodiment, when the movable pedal 120 is in the unfolded state, a distance between the first surface 1211 of the movable pedal 120 and the fourth surface 221 of the side skirt 200 is greater than 100 mm and less than 150 mm, and can be specifically 101 mm, 102 mm, 105 mm, 108 mm, 110 mm, 113 mm, 115 mm, 118 mm, 120 mm, 123 mm, 126 mm, 130 mm, 132 mm, 135 mm, 138 mm, 140 mm, 144 mm, 148 mm and 149 mm, etc. In this way, when the movable pedal 120 is in the unfolded state, a distance between the first surface 1211 and the horizontal ground and a distance between the first surface 1211 and the fourth surface 221 are both within a suitable range, thereby improving the comfort of the drivers and passengers getting in and out of the vehicle 10000. In this embodiment, the distance between the first surface 1211 of the movable pedal 120 and the fourth surface 221 of the side skirt 200 is 145.92 mm.

In an embodiment, a distance between the third surface 1231 of the movable pedal 120 and the seventh surface 2421 of the side skirt 200 is greater than 65 mm and less than 125 mm, and can be specifically 66 mm, 68 mm, 70 mm, 75 mm, 78 mm, 82 mm, 85 mm, 88 mm, 93 mm, 97 mm, 100 mm, 105 mm, 108 mm, 110 mm, 112 mm, 115 mm, 118 mm, 120 mm and 123 mm, etc. In this way, when the movable pedal 120 is in the unfolded state and the drivers and passengers trample the first surface 1211, the drivers and passengers have sufficient footholds, thereby improving the comfort of the drivers and passengers getting in and out of the vehicle 10000. In this embodiment, the distance between the third surface 1231 of the movable pedal 120 and the seventh surface 2421 of the side skirt 200 is 113.95 mm.

Figure 5:
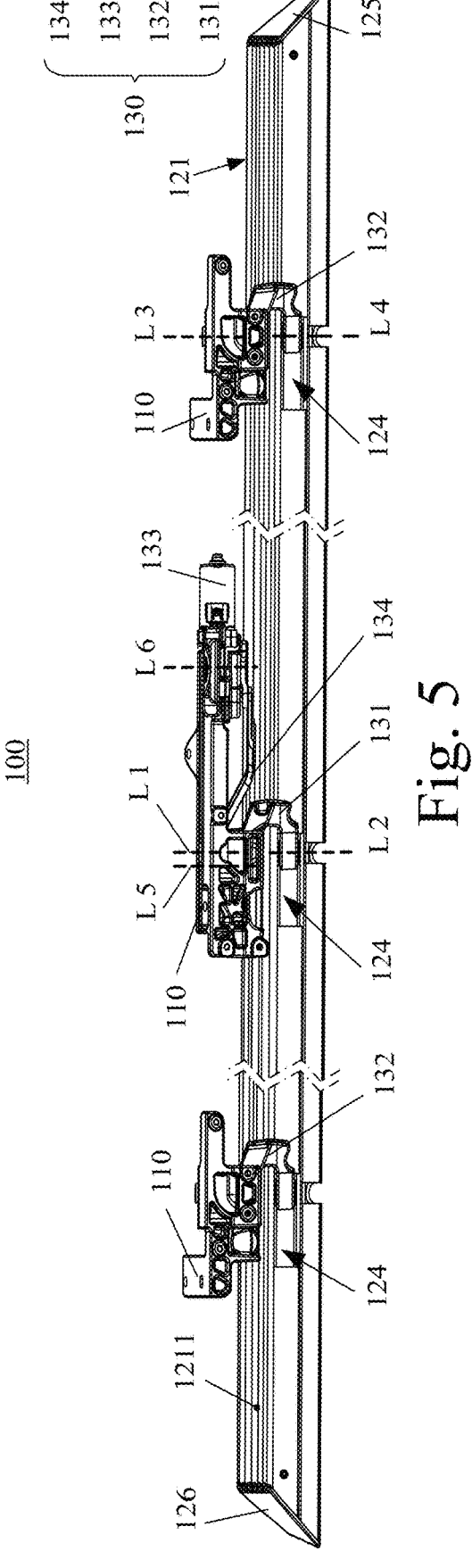
FIG. 5 is a schematic structural diagram of an electric pedal apparatus when a movable pedal is in an unfolded state, provided by some embodiments of the present disclosure.
Figure 6:
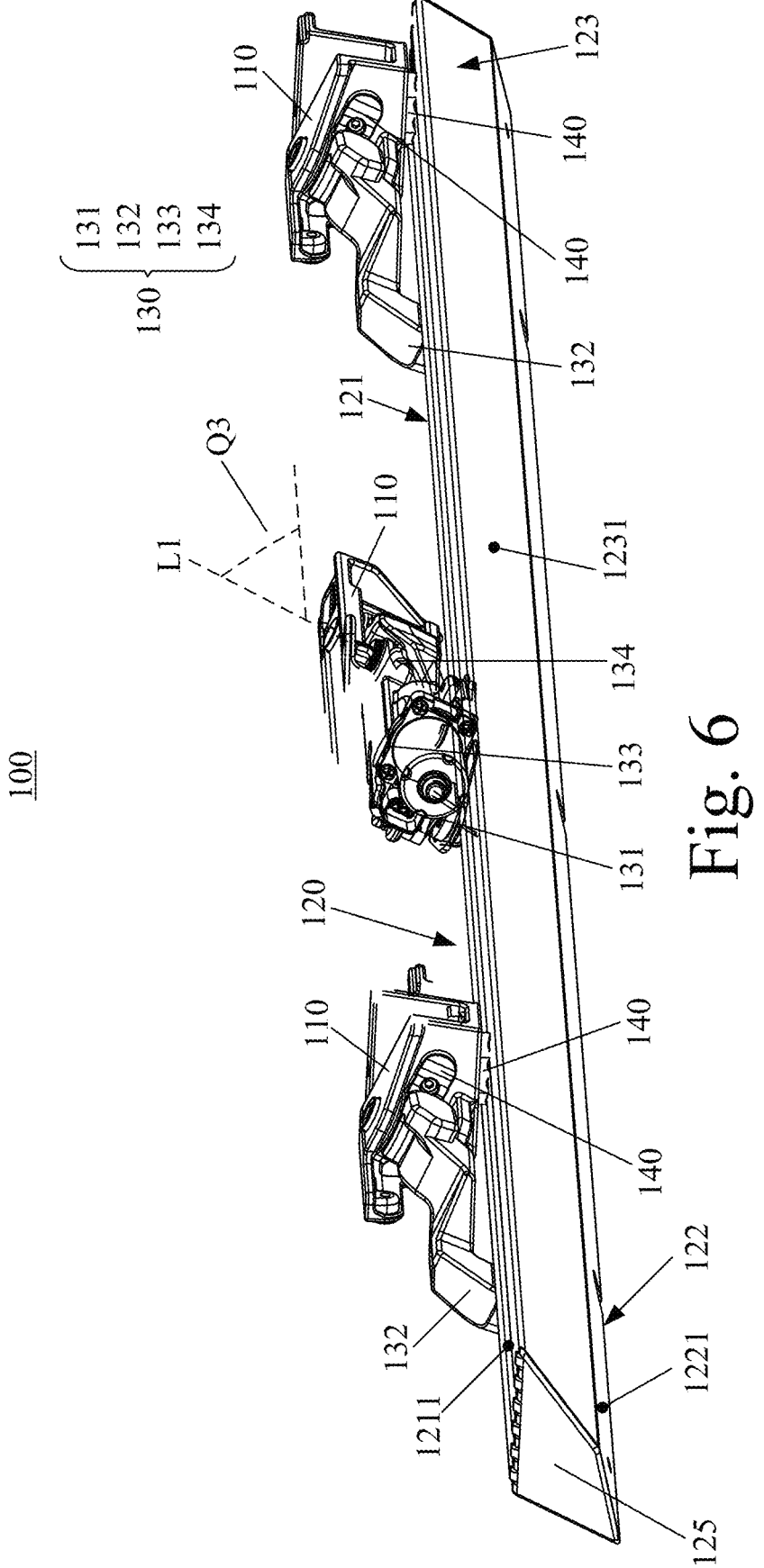
FIG. 6 is a schematic structural diagram of an electric pedal apparatus when a movable pedal is in a retracted state, provided by some embodiments of the present disclosure.
Figure 7:
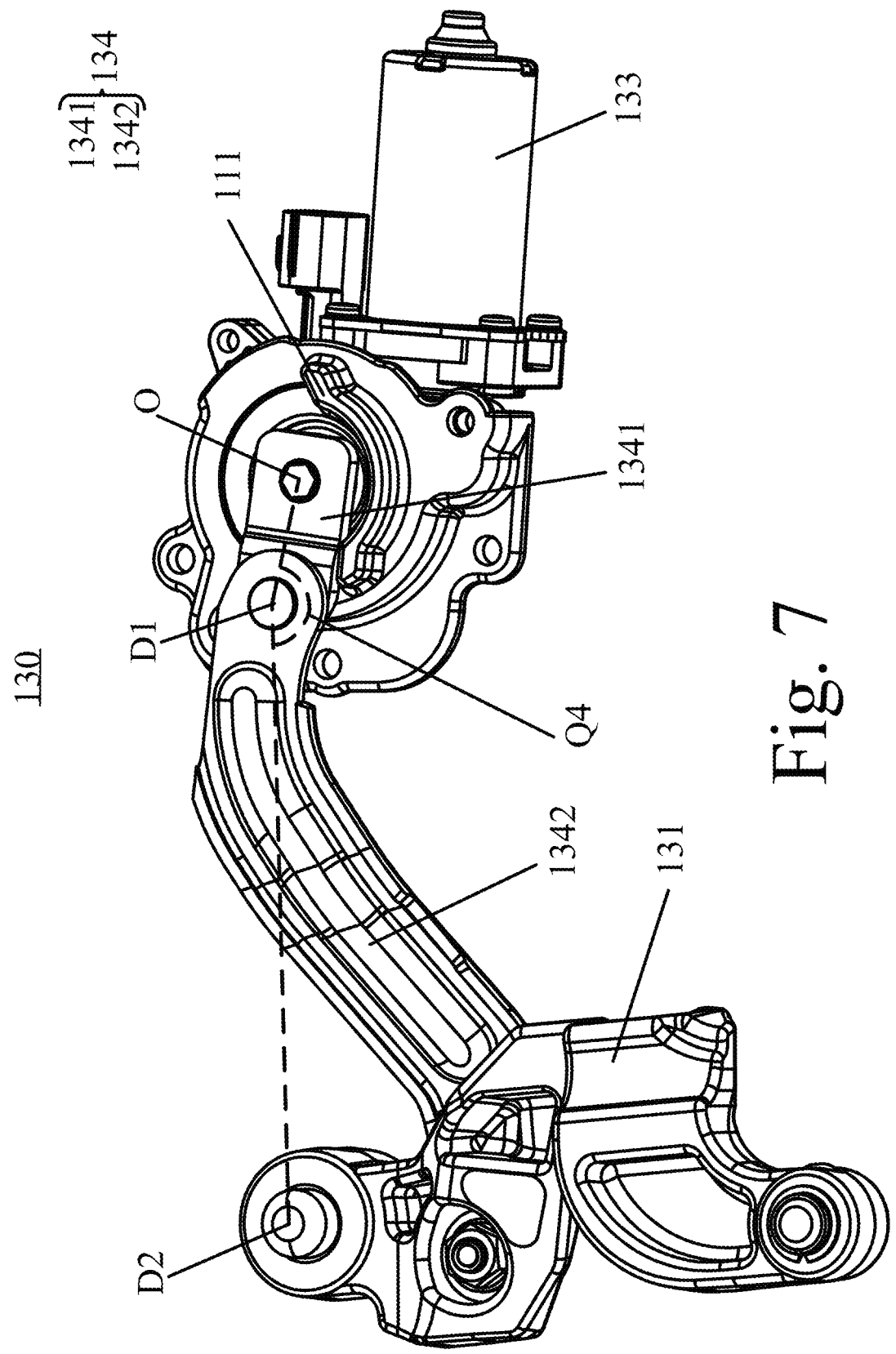
FIG. 7 is a schematic structural diagram of a drive device when a movable pedal is in an unfolded state, provided by some embodiments of the present disclosure.
Figure 8:
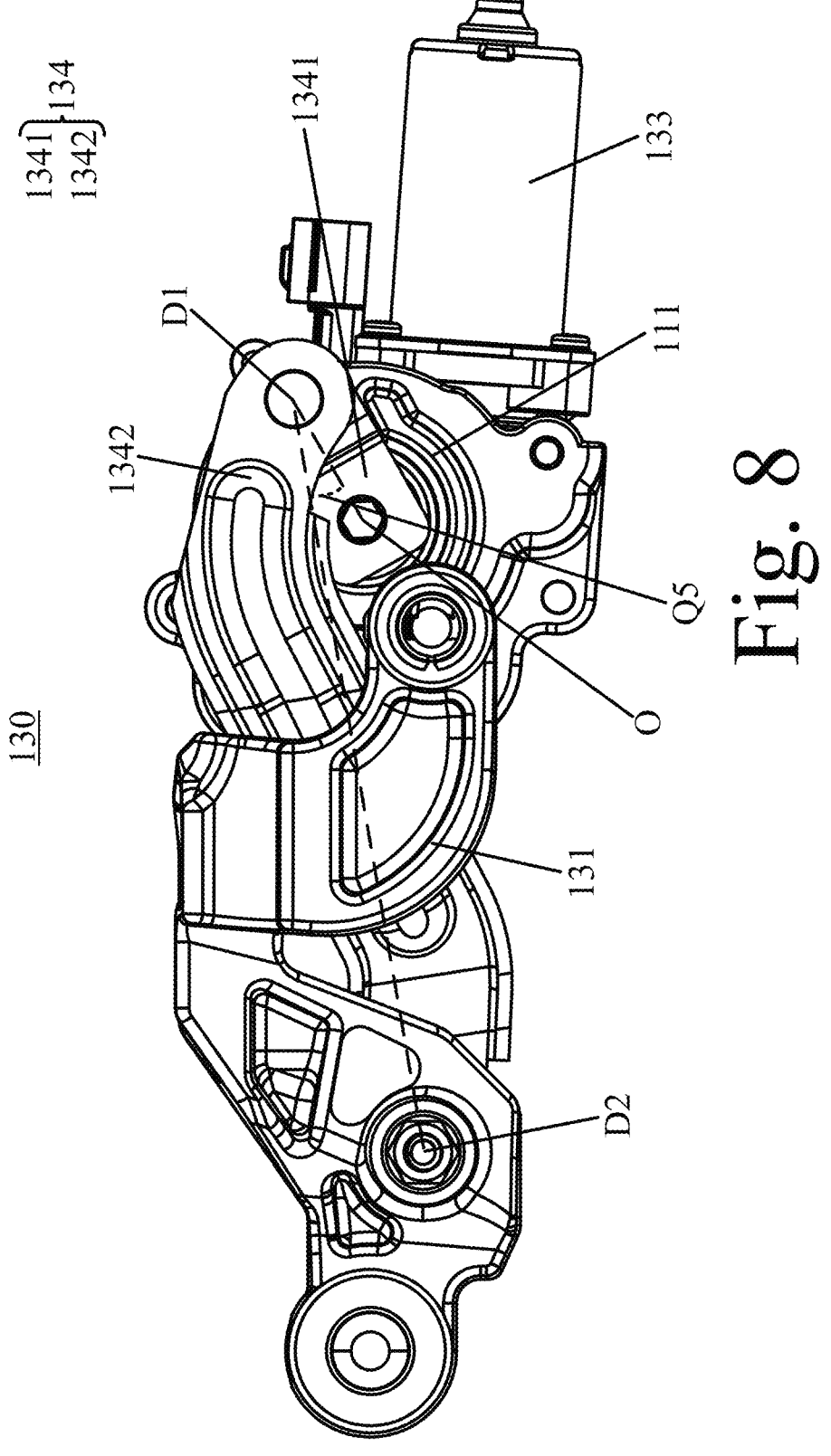
FIG. 8 is a schematic structural diagram of a drive device when a movable pedal is in a retracted state, provided by some embodiments of the present disclosure.

Please refer to FIGS. 1 to 8 in combination, FIG. 5 is a schematic structural diagram of an electric pedal apparatus when a movable pedal is in an unfolded state, provided by some embodiments of the present disclosure. FIG. 6 is a schematic structural diagram of an electric pedal apparatus when a movable pedal is in a retracted state, provided by some embodiments of the present disclosure. FIG. 7 is a schematic structural diagram of a drive device when a movable pedal is in an unfolded state, provided by some embodiments of the present disclosure. FIG. 8 is a schematic structural diagram of a drive device when a movable pedal is in a retracted state, provided by some embodiments of the present disclosure. The electric pedal apparatus 100 provided in the present disclosure can include, but is not limited to, a mounting seat 110, a movable pedal 120, and a drive device 130. The mounting seat 110 is configured to be fixed inside the side skirt 200. The drive device 130 is in drive connection with the movable pedal 120, to drive the movable pedal 120 to be unfolded or retracted relative to the side skirt 200.

In an embodiment, the drive device 130 can include, but is not limited to, an electric motor 133 and at least one drive arm 131. An end of the drive arm 131 is hinged to the mounting seat 110 at the first axis L1. The other end of the drive arm 131 is hinged to the movable pedal 120 at the second axis L2. The electric motor 133 is fixed to the mounting seat 110 and in drive connection with the drive arm 131. Under the drive of the drive arm 131, the movable pedal 120 is expandable or retractable relative to the mounting seat 110.

In an embodiment, the first axis L1 is parallel to the second axis L2, so that the movable pedal 120 can be smoothly switched between the unfolded state and the retracted state. The first axis L1 intersects with a plane where the first surface 1211 of the movable pedal 120 is located at a third included angle Q3. The third included angle Q3 is an acute angle, so that the movable pedal moves away from the mounting seat when moving downward relative to the mounting seat, and moves closer to the mounting seat when moving upward relative to the mounting seat.

The third included angle Q3 is greater than 30° and less than 80°, and can be specifically 31°, 32°, 35°, 38°, 40°, 42°, 45°, 48°, 50°, 52°, 55°, 58°, 60°, 62°, 65°, 68°, 70°, 72°, 75°, 78° and 79°, etc. In this embodiment, the third included angle Q3 is 63.45°.

In an embodiment, when the movable pedal 120 is in the unfolded state, a distance between the first axis L1 and the second axis L2 along the length direction of the movable pedal 120 is greater than or equal to 0 mm and less than 5 mm, and can be specifically 0 mm, 0.23 mm, 0.5 mm, 0.78 mm, 1 mm, 1.3 mm, 1.5 mm, 1.62 mm, 1.8 mm, 1.94 mm, 2 mm, 2.13 mm, 2.3 mm, 2.5 mm, 2.87 mm, 3 mm, 3.2 mm, 3.5 mm, 3.55 mm, 3.8 mm, 4 mm, 4.2 mm, 4.5 mm, 4.76 mm, 4.89 mm and 4.95 mm, etc. In this way, when the movable pedal 120 is in the unfolded state and is subjected to the trampling load applied by the drivers and passengers, the generated additional torque can be prevented from being transmitted to the electric motor 133. In this embodiment, when the movable pedal 120 is in the unfolded state, the distance between the first axis L1 and the second axis L2 along the length direction of the movable pedal 120 is 0.15 mm.

In an embodiment, when the movable pedal 120 is in the retracted state, the distance between the first axis L1 and the second axis L2 along the length direction of the movable pedal 120 is greater than 120 mm and less than 180 mm, and can be specifically 121 mm, 122 mm, 125 mm, 128 mm, 130 mm, 133 mm, 135 mm, 138 mm, 140 mm, 145 mm, 150 mm, 152 mm, 156 mm, 170 mm, 172 mm, 175 mm, 178 mm and 179 mm, etc. In this way, when the movable pedal 120 is in the retracted state, the drive arm 131 can be fully retracted into the side skirt 200, so that the additional torque generated by the inertial load of the movable pedal can be prevented from being transmitted to the electric motor 133 during the acceleration and deceleration of the vehicle 10000. In this embodiment, when the movable pedal 120 is in the retracted state, the distance between the first axis L1 and the second axis L2 along the length direction of the movable pedal 120 is 137.5 mm.

In an embodiment, the drive device 130 further includes a support arm 132. An end of the support arm 132 is hinged to the mounting seat 110 at the third axis L3. The other end of the support arm 132 is hinged to the movable pedal 120 at the fourth axis L4. The third axis L3 is parallel to the fourth axis L4 and the first axis L1, so that the movable pedal 120 can be smoothly switched between the unfolded state and the retracted state. In this embodiment, the drive device includes two support arms 132. The drive arm 131 is positioned between the two support arms 132, to provide stable support for the movable pedal 120.

In an embodiment, the electric pedal apparatus 100 further includes at least two cushion pads 140. When the movable pedal 120 is in the unfolded state, at least one of the support arm 132 and the drive arm 131 abuts against at least one of the cushion pads 140, so that the movable pedal 120 can smoothly reach the unfolded state and avoid shaking or rigid friction of the drive arm 131 or the support arm 132 when the movable pedal 120 is subjected to a trampling load. When the movable pedal 120 is in the retracted state, the movable pedal 120 abuts against at least one of the cushion pads 140, so that the movable pedal 120 can smoothly reach the retracted state and avoid shaking or rigid friction of the movable pedal 120 caused by the inertia generated during the driving of the vehicle 10000. In this embodiment, the electric pedal apparatus 100 includes four cushion pads 140. The four cushion pads 140 are mounted on the mounting seat 110. When the movable pedal 120 is in the unfolded state and a plurality of support arms are provided, each of the plurality of support arms 132 abuts against a respective one of the cushion pads 140. When the movable pedal 120 is in the retracted state, both ends of the movable pedal 120 abut against one cushion pad 140, respectively.

In an embodiment, the drive device 130 further includes a link assembly 134. An end of the link assembly 134 is connected to an output shaft of the electric motor 133. The other end of the link assembly 134 is hinged to the drive arm 131 at the fifth axis L5. The fifth axis L5 is parallel to the first axis L1, and a central axis L6 of the output shaft of the electric motor 133 is parallel to the first axis L1, so that the electric motor 133 can smoothly drive the movable pedal 120 to switch between the unfolded state and the retracted state through the link assembly 134. It can be understood that, under the drive of the electric motor 133, the link assembly 134 drives the drive arm 131 through the fifth axis L5, and then the drive arm 131 drives the movable pedal 120, to achieve the unfolding and retraction of the movable pedal 120 relative to the mounting seat 110.

In an embodiment, when the movable pedal 120 is in the unfolded state, a distance between the first axis L1 and the fifth axis L5 along the length direction of the movable pedal 120 is greater than 0 mm and less than 15 mm, and can be specifically 1 mm, 1.5 mm, 2 mm, 2.8 mm, 3.4 mm, 4.2 mm, 4.8 mm, 5.2 mm, 5.6 mm, 7.4 mm, 8.3 mm, 8.8 mm, 9 mm, 9.6 mm, 10.4 mm, 10.9 mm, 11.5 mm, 12.1 mm, 12.7 mm, 13.2 mm, 13.8 mm, 14.5 mm and 14.8 mm, etc. In this way, when the movable pedal 120 is in the unfolded state, the force of the link assembly 134 acting on the drive arm 131 is balanced with the force of the cushion pads 140 acting on the support arm 132, so that the movable pedal 120 can be stably in the unfolded state. In this embodiment, when the movable pedal 120 is in the unfolded state, the distance between the first axis L1 and the fifth axis L5 along the length direction of the movable pedal 120 is 7.33 mm.

In an embodiment, when the movable pedal 120 is in the retracted state, the distance between the first axis L1 and the fifth axis L5 along the length direction of the movable pedal 120 is greater than 0 mm and less than 60 mm, and can be specifically 1 mm, 5 mm, 8 mm, 10 mm, 12 mm, 15 mm, 18 mm, 20 mm, 22 mm, 25 mm, 28 mm, 30 mm, 33 mm, 35 mm, 37 mm, 40 mm, 45 mm, 48 mm, 52 mm, 55 mm and 58 mm, etc. In this way, when the movable pedal 120 is in the retracted state, the force of the link assembly 134 acting on the drive arm 131 is balanced with the force of the cushion pads 140 acting on the support arm 132, so that the movable pedal 120 can be stably in the retracted state. In this embodiment, when the movable pedal 120 is in the retracted state, the distance between the first axis L1 and the fifth axis L5 along the length direction of the movable pedal 120 is 41.58 mm.

In an embodiment, when the movable pedal 120 is in the unfolded state, a distance between the first axis L1 and the output shaft along the length direction of the movable pedal 120 is less than a distance between the fifth axis L5 and the output shaft. When the movable pedal 120 is in the retracted state, the distance between the first axis L1 and the output shaft along the length direction of the movable pedal 120 is greater than that between the fifth axis L5 and the output shaft. In this way, the spatial arrangement of the electric motor 133 can be optimized, so that the electric pedal apparatus 100 can be easily fixed to the vehicle 10000.

In an embodiment, when the movable pedal 120 switches between the unfolded state and the retracted state, the rotation angle of the output shaft of the electric motor 133 is greater than 110° and less than 150°, and can be specifically 111°, 112°, 115°, 118°, 120°, 122°, 125°, 128°, 130°, 132°, 135°, 138°, 140°, 142°, 145°, 148° and 149°, etc. In this embodiment, the rotation angle of the output shaft of the electric motor 133 is 135°. When the movable pedal 120 switches between the unfolded state and the retracted state, the rotation angle of the drive arm 131 is greater than 60° and less than 120°, and can be specifically 61°, 62°, 65°, 68°, 70°, 72°, 75°, 78°, 80°, 82°, 85°, 88°, 90°, 92°, 95°, 98°, 100°, 102°, 105°, 108°, 110°, 112°, 115°, 118° and 119°, etc. In this embodiment, the rotation angle of the drive arm 131 is 90°. It can be understood that the link assembly 134 can play a role in reducing speed and increasing torque, thereby improving the starting ability of the drive device 130.

In an embodiment, the mounting seat 110 includes a limiting structure 111 that is arranged around the output shaft of the electric motor 133. The limiting structure 111 is configured to limit the swing amplitude of the link assembly 134, to prevent the movable pedal 120 from being excessively unfolded and retracted.

In an embodiment, the link assembly 134 includes a first link 1341 and a second link 1342. An end of the first link 1341 is connected to the output shaft at a central point O. The other end of the first link 1341 is hinged to an end of the second link 1342 at a first hinge point D1. The other end of the second link 1342 is hinged to the drive arm 131 at a second hinge point D2.

When the movable pedal 120 is in the unfolded state, a connecting line between the first hinge point D1 and the central point O intersects with that between the first hinge point D1 and the second hinge point D2 to obtain a fourth included angle Q4. The fourth included angle Q4 is greater than 135° and less than or equal to 180°, and can be specifically 138°, 140°, 142°, 145°, 148°, 150°, 152°, 155°, 158°, 160°, 162°, 165°, 168°, 170°, 172°, 175°, 178° and 180°, etc. In this way, the link assembly 134 obtains a certain self-locking ability when the movable pedal 120 is in the unfolded state, and at the same time, the driving ability of the electric motor 133 to the link assembly 134 is not affected. In this embodiment, the fourth included angle Q4 is 165°.

When the movable pedal 120 is in the retracted state, the connecting line between the first hinge point D1 and the central point O intersects with that between the first hinge point D1 and the second hinge point D2 to obtain a fifth included angle Q5. The fifth included angle Q5 is greater than or equal to 0° and less than 45°, and can be specifically 0°, 5°, 8°, 12°, 15°, 18°, 20°, 23°, 25°, 28°, 30°, 32°, 35°, 38°, 40° and 43°, etc. In this way, the link assembly 134 obtains a certain self-locking ability when the movable pedal 120 is in the retracted state, and at the same time, the driving ability of the electric motor 133 to the link assembly 134 is not affected. In this embodiment, the fifth included angle Q5 is 13.26°.

Figure 9:
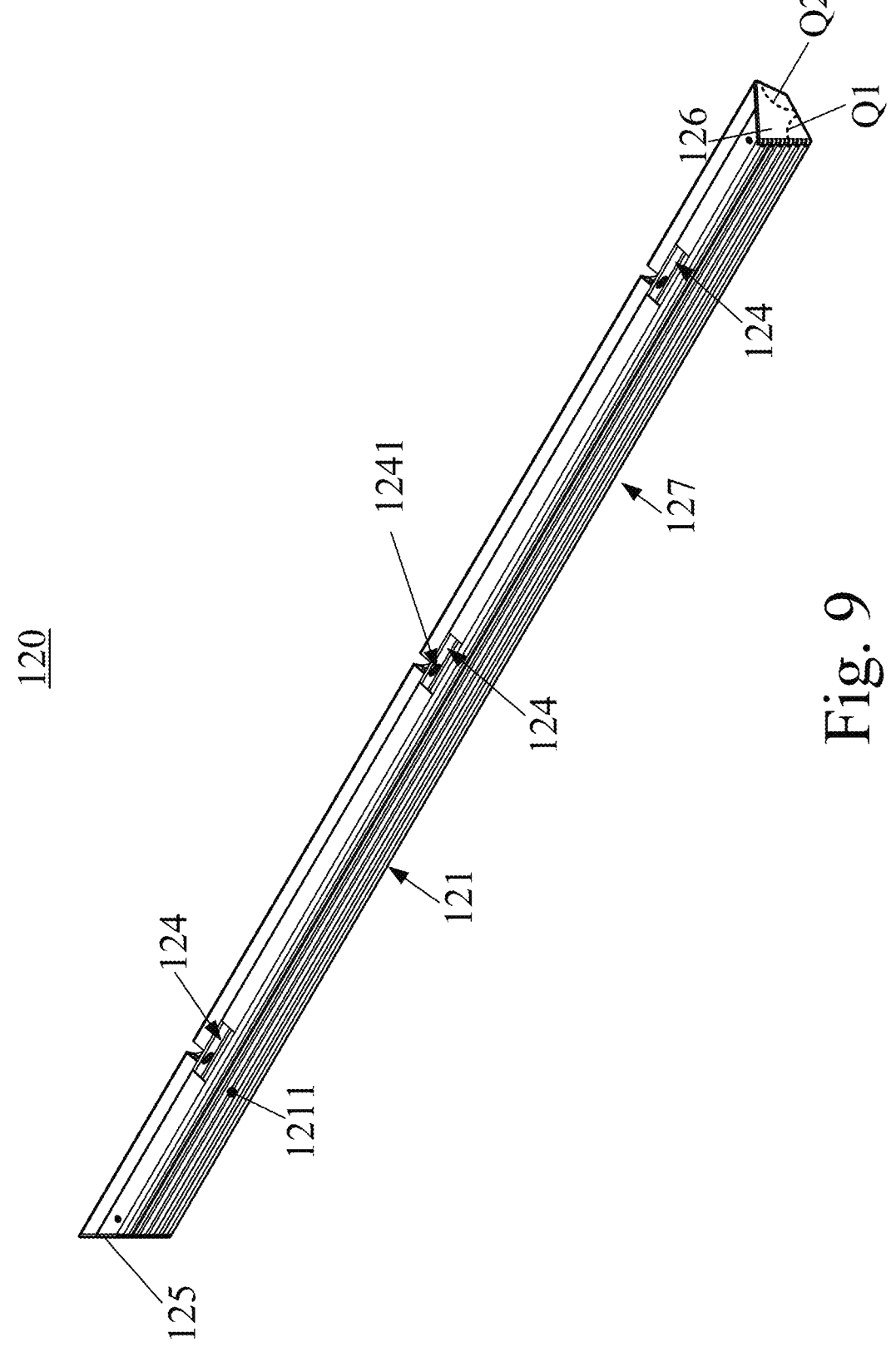
FIG. 9 is a schematic structural diagram of a movable pedal provided in some embodiments of the present disclosure.

Please refer to FIGS. 1 to 9 in combination. FIG. 9 is a schematic structural diagram of a movable pedal provided in some embodiments of the present disclosure. The movable pedal 120 provided in the present disclosure is applied to the vehicle 10000. The movable pedal 120 can include, but is not limited to, a pedal body 127. A first surface 1211 is provided on the upper side of the pedal body 127, and the first surface 1211 is configured for being trampled by drivers and passengers. A mounting slot 124 is formed in an approaching side of the pedal body 127, and a notch of the mounting slot 124 faces the vehicle 10000. A drive device 130 can be connected to the pedal body 127 through the mounting slot 124 in a blind assembly, where the drive device 130 can drive the pedal body 127 to switch between an unfolded state and a retracted state.

In an embodiment, a first panel 121 is provided on the upper side of the pedal body 127. A second panel 122 is provided on the lower side of the pedal body 127. A third panel 123 is provided on the far side of the pedal body. The third panel 123 is connected between the first panel 121 and the second panel 122. The first surface 1211 is formed on the first panel 121. The second panel 122 is provided with a second surface 1221 opposite to the first surface 1211. The third panel 123 is provided with a third surface 1231. The third surface 1231 intersects with the first surface 1211 to obtain a first included angle Q1, where the first included angle Q1 is an acute angle. The first included angle Q1 is greater than 45° and less than 80°, and can be specifically 48°, 50°, 52°, 55°, 58°, 60°, 62°, 65°, 68°, 70°, 72°, 75°, 78° and 79°, etc. In this embodiment, the first included angle Q1 is 48.56°. The third surface 1231 intersects with the second surface 1221 to obtain a second included angle Q2, where the second included angle Q2 is an obtuse angle. The second included angle Q2 is greater than 130° and less than 160°, and can be specifically 132°, 135°, 138°, 140°, 142°, 145°, 148°, 150°, 152°, 155°, 158°, etc. In this embodiment, the second included angle Q2 is 148.87°.

In an embodiment, a hinge hole 1241 is formed in a side wall defining the mounting slot 124. The drive device 130 is hinged to the pedal body 127 through the hinge hole 1241. In an implementation, at least one of the drive arm 131 and the support arm 132 of the drive device 130 is hinged to the pedal body 127 through the hinge hole 1241, to drive the pedal body 127 to unfold or retract relative to the mounting seat 110.

In an embodiment, the movable pedal 120 further includes a first end cover 125 and a second end cover 126. The first end cover 125 is covered on an end of the movable pedal 120, and the second end cover 126 is covered on the other end of the movable pedal 120, so as to block both ends of the movable pedal 120. In this way, foreign objects (such as dust, stones) can be prevented from entering the interior of the movable pedal 120 to cause abnormal noise.

The movable pedal 120 provided by the present disclosure is applied to the vehicle 10000. The movable pedal 120 includes a pedal body 127. A first surface 1211 is provided on the upper side of the pedal body 127, and the first surface 1211 is configured for being trampled by drivers and passengers. A mounting slot 124 is formed in an approaching side of the pedal body 127, and a notch of the mounting slot 124 faces the vehicle 10000. A drive device 130 is able to be connected to the pedal body 127 through the mounting slot 124 in a blind assembly, where the drive device 130 can drive the pedal body 127 to switch between an unfolded state and a retracted state. In the technical scheme of the present disclosure, since the position at which the drive device 130 is connected to the pedal body 127 is arranged in the mounting slot 124, the pedal surface area of the pedal body 127 is fully utilized. Furthermore, due to the blind connection of the drive device 130 and the pedal body 127, the pedal body 127 can remain neat and artistic when in the unfolded state. In this way, the pedal surface area of the movable pedal 120 is highly utilized and the movable pedal 120 can remain neat and artistic when in the unfolded state.

The above are some embodiments of the present disclosure, instead of limiting the protection scope of the present disclosure. The equivalent apparatus or process transformations made according to the contents of the specification and the drawings of the present disclosure or direct or indirect application of the scheme of the present disclosure in other related technical fields fall within the protection scope of the present disclosure.

What is claimed is:

1. An electric pedal apparatus, comprising a drive device and a movable pedal, wherein the drive device is in drive connection with the movable pedal;

the movable pedal is applied to a vehicle, the movable pedal comprises:

a pedal body;

a first surface being provided on an upper side of the pedal body, and the first surface configured for being trampled by drivers and passengers; and a mounting slot being formed in an approaching side of the pedal body, a notch of the mounting slot facing the vehicle, and the drive device being able to be connected to the pedal body through the mounting slot in a blind assembly;

wherein the drive device is able to drive the pedal body to switch between an unfolded state and a retracted state;

wherein the electric pedal apparatus comprises a mounting seat, and the drive device comprises:

at least one drive arm, an end of each of the at least one drive arm being hinged to the mounting seat at a first axis, and the other end of each of the at least one drive arm being hinged to the movable pedal at a second axis; and an electric motor fixed to the mounting seat and in drive connection with the at least one drive arm;

wherein the movable pedal is able to unfold or retract relative to the mounting seat under the drive of the at least one drive arm.

2. The electric pedal apparatus according to claim 1, wherein a first panel is provided on the upper side of the pedal body, a second panel is provided on a lower side of the pedal body, and a third panel is provided on a far side of the pedal body, wherein the third panel is connected between the first panel and the second panel; and the first surface is formed on the first panel, the second panel is provided with a second surface opposite to the first surface, and the third panel is provided with a third surface, wherein the third surface intersects with the first surface to obtain a first included angle, and the third surface intersects with the second surface to obtain a second included angle;

wherein the first included angle is greater than 45° and less than 80°, and the second included angle is greater than 130° and less than 160°.

3. The electric pedal apparatus according to claim 1, wherein a hinge hole is formed in a side wall of the mounting slot, and the drive device is hinged to the pedal body through the hinge hole.

4. The electric pedal apparatus according to claim 1, wherein the first axis is parallel to the second axis, the first axis intersects with a plane where the first surface of the movable pedal is located to obtain a third included angle, and the third included angle is greater than 30° and less than 80°.

5. The electric pedal apparatus according to claim 1, wherein when the movable pedal is in the unfolded state, a distance between the first axis and the second axis is greater than or equal to 0 mm and less than 5 mm along a length direction of the movable pedal; and when the movable pedal is in the retracted state, the distance between the first axis and the second axis is greater than 120 mm and less than 180 mm along the length direction of the movable pedal.

6. The electric pedal apparatus according to claim 1, wherein the drive device further comprises a support arm, an end of the support arm is hinged to the mounting seat at a third axis, the other end of the support arm is hinged to the movable pedal at a fourth axis, wherein the third axis is parallel to the fourth axis and the first axis.

7. The electric pedal apparatus according to claim 6, wherein the electric pedal apparatus further comprises at least two cushion pads, when the movable pedal is in the unfolded state, at least one of the support arm and the at least one drive arm abuts against at least one of the at least two cushion pads; and when the movable pedal is in the retracted state, the movable pedal abuts against at least one of the at least two cushion pads.

8. The electric pedal apparatus according to claim 1, wherein the drive device further comprises a link assembly, an end of the link assembly is connected to an output shaft of the electric motor, the other end of the link assembly is hinged to the drive arm at a fifth axis, wherein the fifth axis is parallel to the first axis, and a central axis of the output shaft is parallel to the first axis.

9. The electric pedal apparatus according to claim 8, wherein when the movable pedal is in the unfolded state, a distance between the first axis and the fifth axis is greater than 0 mm and less than 15 mm along a length direction of the movable pedal; and when the movable pedal is in the retracted state, the distance between the first axis and the fifth axis is greater than 0 mm and less than 60 mm along the length direction of the movable pedal.

10. The electric pedal apparatus according to claim 8, wherein when the movable pedal is in the unfolded state, a distance between the first axis and the output shaft is less than a distance between the fifth axis and the output shaft along a length direction of the movable pedal; and when the movable pedal is in the retracted state, the distance between the first axis and the output shaft is greater than the distance between the fifth axis and the output shaft along the length direction of the movable pedal.

11. The electric pedal apparatus according to claim 8, wherein the link assembly comprises a first link and a second link, an end of the first link is connected to the output shaft at a central point, the other end of the first link is hinged to an end of the second link at a first hinge point, and the other end of the second link is hinged to the drive arm at a second hinge point.

12. The electric pedal apparatus according to claim 11, wherein when the movable pedal is in the unfolded state, a connecting line between the first hinge point and the central point intersects with a connecting line between the first hinge point and the second hinge point to obtain a fourth included angle; and when the movable pedal is in the retracted state, the connecting line between the first hinge point and the central point intersects with the connecting line between the first hinge point and the second hinge point to obtain a fifth included angle;

wherein the fourth included angle is greater than 135° and less than or equal to 180°, and the fifth included angle is greater than or equal to 0° and less than 45°.

13. The electric pedal apparatus according to claim 8, wherein the mounting seat comprises a limiting structure, the limiting structure is arranged around the output shaft of the electric motor and configured to limit a swing amplitude of the link assembly.

14. The electric pedal apparatus according to claim 13, wherein when the movable pedal switches between the unfolded state and the retracted state, a rotation angle of the output shaft of the electric motor is greater than 110° and less than 150°, and a rotation angle of the drive arm is greater than 60° and less than 120°.

15. A pedal system, comprising an electric pedal apparatus and a side skirt, the side skirt being able to be fixed to a vehicle and provided with a receiving cavity, the electric pedal apparatus comprising a mounting seat and a movable pedal capable of being unfolded or retracted relative to the mounting seat, wherein the mounting seat is arranged in the receiving cavity, and when the movable pedal is in a retracted state, at least a part of the structure of the movable pedal is allowed to be received in the receiving cavity; and wherein the electric pedal apparatus further comprises a drive device, the drive device is in drive connection with the movable pedal, and the movable pedal comprises a pedal body; a first surface is provided on an upper side of the pedal body, and the first surface is configured for being trampled by drivers and passengers; a mounting slot is formed in an approaching side of the pedal body, and a notch of the mounting slot facing the vehicle, and the drive device is able to be connected to the pedal body through the mounting slot in a blind assembly; wherein the drive device is able to drive the pedal body to switch between an unfolded state and a retracted state.

16. The pedal system according to claim 15, wherein the pedal system further comprises a first sheet metal assembly and a second sheet metal assembly; and the mounting seat is fixed to the side skirt through the first sheet metal assembly, and fixed to the vehicle through the second sheet metal assembly.

17. The pedal system according to claim 15, wherein a fourth panel is provided on an upper side of the side skirt, a fifth panel is provided on a lower side of the side skirt, and a sixth panel is provided on a far side of the side skirt, wherein the sixth panel is connected between the fourth panel and the fifth panel, and the sixth panel comprises a first sub-panel and a second sub-panel that are connected to each other; and the fourth panel is provided with a fourth surface that is parallel to the first surface of the movable pedal, the fifth panel is provided with a fifth surface that is parallel to the fourth surface, the first sub-panel is provided with a sixth surface that intersects with the fourth surface at a sixth included angle, the second sub-panel is provided with a seventh surface that intersects with the sixth surface at a seventh included angle, and intersects with the fifth surface at an eighth included angle;

wherein the sixth included angle is greater than 45° and less than 90°, the seventh included angle is greater than 130° and less than 160°, and the eighth included angle is greater than 130° and less than 160°.

18. The pedal system according to claim 17, wherein when the movable pedal is in the retracted state, a third panel of the movable pedal is flush with the second sub-panel of the side skirt, and a second panel of the movable pedal is flush with the fifth panel of the side skirt; and when the movable pedal is in the unfolded state, a distance between the first surface of the movable pedal and the fourth surface of the side skirt is greater than 100 mm and less than 150 mm, and a distance between a third surface of the movable pedal and the seventh surface of the side skirt is greater than 65 mm and less than 125 mm.

19. The pedal system according to claim 15, wherein the electric pedal apparatus comprises a mounting seat, and the drive device comprises:

at least one drive arm, an end of each of the at least one drive arm being hinged to the mounting seat at a first axis, and the other end of each of the at least one drive arm being hinged to the movable pedal at a second axis; and an electric motor fixed to the mounting seat and in drive connection with the at least one drive arm, wherein the movable pedal is able to unfold or retract relative to the mounting seat under the drive of the at least one drive arm.

\* \* \* \* \*